UNITED STATES PATENT OFFICE.

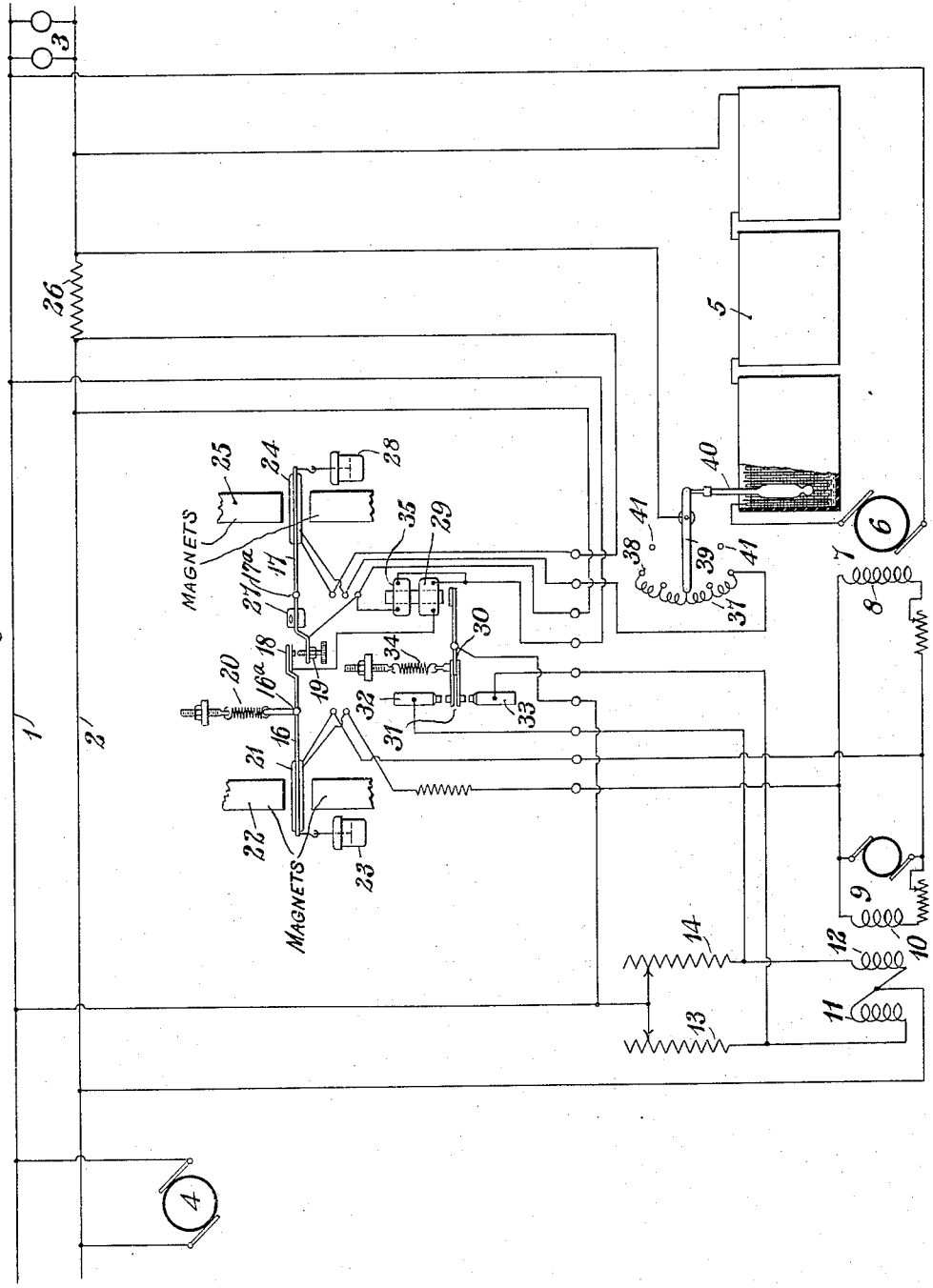

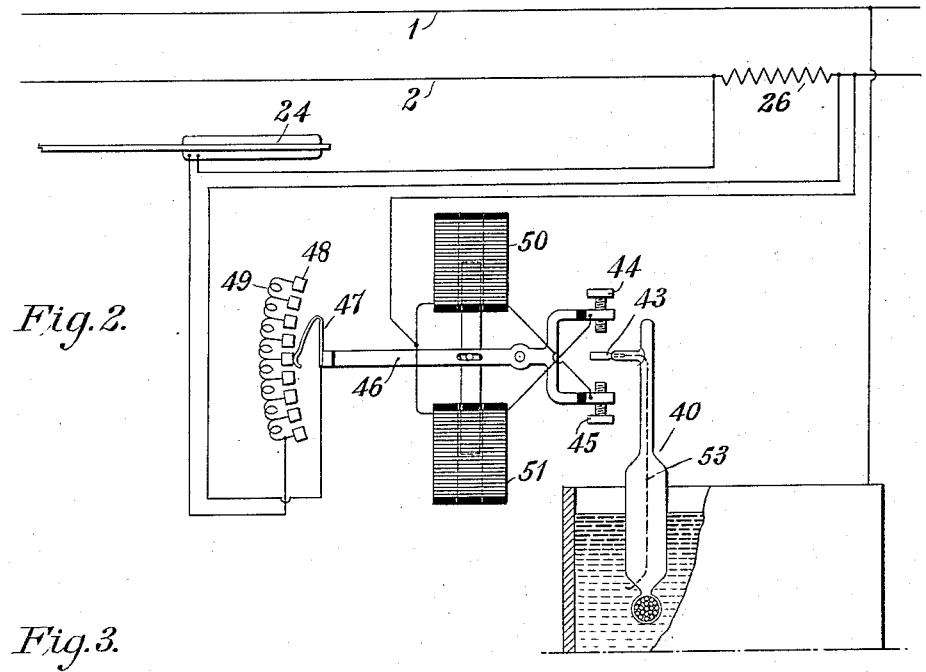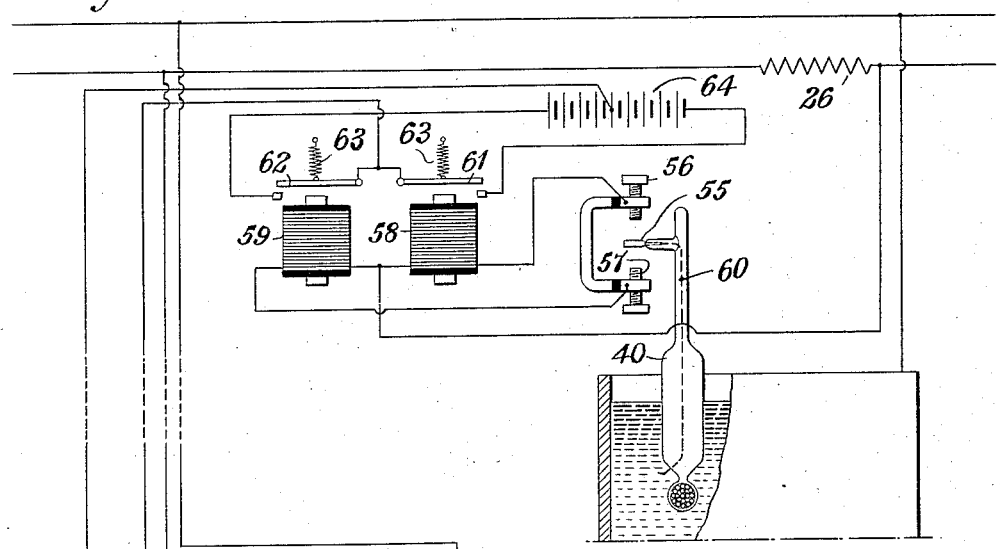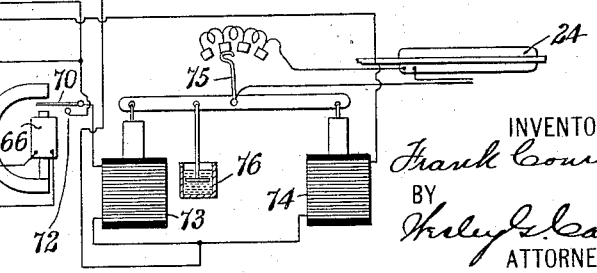

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

STORAGE-BATTERY REGULATOR.

1,146,924.  Specification of Letters Patent.  Patented July 20, 1915.

Application filed March 15, 1909. Serial No. 483,660.

*To all whom it may concern:*

Be it known that I, FRANK CONRAD, a citizen of the United States, and a resident of Swissvale, in the county of Allegheny and State of Pennsylvania, have invented a new and useful Improvement in Storage-Battery Regulators, of which the following is a specification.

My invention relates to regulators for storage batteries, and it has for its object to provide a regulator whereby a battery may be automatically maintained in such intermediate charged condition that it may respond efficiently to substantially all of the varying demands upon it, as regards both delivering and receiving current.

Since the specific gravity of the electrolyte of a storage battery varies with the degree of charge of the battery, the regulating action is automatically effected, in the present instance, in accordance therewith, and in such a manner that, as the battery becomes discharged in supplying a continuous heavy load upon the circuit, and its specific gravity accordingly decreases, the generator will be caused to assume an increased proportion of the total load, and will continue to supply an increased amount of current until the battery again becomes charged to a predetermined degree, as indicated by the specific gravity of its electrolyte.

My invention is illustrated in the accompanying drawings, Figure 1 of which is a diagrammatic view of a system of distribution embodying the invention. Fig. 2 is a diagrammatic view illustrating a modification of a portion of the system of Fig. 1, and Fig. 3 is a diagrammatic view of a system embodying another modification of the invention.

In another application Serial No. 325,291, filed July 9, 1906, I have set forth a regulator for a storage battery whereby the load carried by the generator in connection with which the battery is employed may be maintained substantially constant, and the voltage applied to the circuit by the storage battery may also be maintained substantially constant, irrespective of whether it is fully or only partially charged. Such a regulator is employed for the purpose of causing the battery to carry the peaks and temporary excesses of the load upon the circuit, and to charge when the load upon the circuit is less than a predetermined amount. A further purpose of such a regulator is to supplement the voltage of the battery, which varies with the degree of its charge, by a variable booster voltage such that the voltage of the circuit may be maintained substantially constant. In the use of this regulator, however, and of all others with which I am familiar, it is necessary to periodically observe the specific gravity of the electrolyte of the battery, in order to determine its condition as regards charge, and to manually adjust the regulator so that the generator will carry an increased proportion of the total load upon the circuit when the battery is low in charge; *i. e.*, when the specific gravity of its electrolyte is low, and so that, when it is fully charged, the generator will carry a diminished proportion of the total load.

According to the present invention, means are employed for automatically adjusting the operation of the regulator in accordance with the specific gravity of the electrolyte, or the degree of charge of the battery, thus insuring the most efficient operation of the battery and reducing the work and expense of attendance.

Referring to Fig. 1, an electrical circuit 1—2, to which a variable load, represented by translating devices 3, is connected, is supplied from a main generator 4 and a storage battery 5, the latter being connected to the circuit in series with armature 6 of a booster generator 7. Field magnet winding 8 of the booster generator is supplied from an exciter 9 having a main shunt field magnet winding 10 and two auxiliary field magnet windings 11 and 12 that are arranged to oppose each other, and that are connected in parallel across the circuit 1—2 and respectively in series with resistances 13 and 14, though they may of course be connected to any other suitable circuit of substantially constant potential. The resistances 13 and 14 are adapted to be alternately shunted by means of a regulating device that will be presently described, the effect of such shunting of the resistances being to cause the one or the other of the auxiliary field magnet windings 11 and 12 of the exciter to predominate in its magnetizing effect and thus cause the exciter to effect a maximum or a minimum excitation of the booster field.

The ampere-turns of the auxiliary field magnet windings are such that the polarity of the exciter is dependent upon which of the windings predominates in its magnetizing effect: i. e., such that if the resistance 13 is shunted, field magnet winding 11 predominates in its magnetizing effect, and the voltage of the exciter 9 will be in such a direction that the voltage of the booster 7 will supplement that of the battery 5, whereas, if the resistance 14 is shunted and the winding 12 predominates in its magnetizing effect, the voltage of the booster will oppose that of the battery 5.

The regulating means is substantially like that set forth in my previous application, Serial No. 325,291, and comprises a main relay device consisting of two pivotally mounted arms 16 and 17 that carry, at their adjacent extremities, coöperating contact terminals 18 and 19, the terminal 19 being a screw that is adjustable in position to vary the distance between it and the other terminal 18. The pivot of the arm 16 is at 16$^a$ and of the arm 17 at 17$^a$. The arm 16 is maintained in a substantially horizontal position by means of a centralizing spring 20 and is adapted to be rotated about its pivotal support by means of an electro-magnetic actuating device consisting of a coil 21, that is connected between the terminals of the exciter 9, and permanent magnets 22 between the poles of which the coil 21 is movable. It will be understood that the direction of current flow in the booster field circuit, and the direction of movement of the coil will, accordingly, depend upon the direction of current flow therein. The circuit connections are so arranged that when the direction of current flow in the booster field is such that the booster voltage supplements that of the battery, the coil 21 moves upwardly and the contact terminal 18 approaches the terminal 19, and, when the direction of current flow in the booster field circuit is such that the booster voltage opposes that of the battery, the winding 21 is moved downwardly and the contact terminal 18 recedes from the terminal 19. The movements of the arm 16 may be retarded by means of a dash-pot, such as that shown at 23, or by any other suitable means.

The other arm 17 of the relay device is actuated to vary the position of the contact terminal 19 by means of a coil 24 that is movable between the poles of permanent magnets 25 and is connected in shunt to a resistance device 26 in the circuit conductor 2, so that it is traversed by current which is proportional, in amount, to the current supplied to the circuit by the generator 4. The weight of the coil 24 is partially counterbalanced by means of a counter-weight 27 that is adjustable longitudinally thereof, and the direction of current flow in the coil 24 is such as to tend to rotate the arm 17 in a counter-clockwise direction, in opposition to the effect of gravity. The movements of the arm 17 are also retarded by suitable means, such as a dash-pot 28.

The contact terminals 18 and 19 govern the circuit of a magnet winding 29 of an auxiliary relay device that, in turn, governs shunt circuits to the resistances 13 and 14, this relay device consisting, further, of a pivotally mounted arm 30 carrying flexibly supported contact terminals 31 that operate between, and are adapted to alternately engage, stationary terminals 32 and 33. The terminals 32 and 33 are connected, respectively, to terminals of the resistances 14 and 13, and the arm 30 is connected to the common terminal of the said resistances. One of the contact terminals 31 is normally maintained in engagement with the stationary terminal 32 by means of a spring 34, the tension of which may be regulated, and the other contact terminal 31 is adapted to be moved downwardly into engagement with the stationary terminal 33 by means of an electro-magnet having two windings, of which the coil 29 is one winding and coil 35 is the other, the latter coil being connected permanently between line conductors 1 and 2. The effect of the coil 35, when current traverses the circuit 1—2, is to maintain the terminals 31 and 33 in engagement, except when the coil 29 is energized by reason of the engagement of terminals 18 and 19, the effects of the coils 29 and 35 then neutralizing each other. The spring 34 is then permitted to effect engagement of the terminals 31 and 32.

The amount of current that traverses the circuit in shunt to the resistance 26, which circuit includes the coil 24, is regulated automatically in accordance with the variations in the specific gravity of the electrolyte of the battery 5 by means of a rheostat comprising a resistance 37, suitable points of subdivision of which are connected to stationary contact terminals 38, and a pivotally mounted arm 39 that is actuated by means of an hydrometer 40 placed in the electrolyte of the battery, the arm 39 being adapted to engage and move over the stationary contact terminals 38. As the battery discharges, and the specific gravity of its electrolyte decreases, the hydrometer 40 sinks and the resistance in circuit with the coil 24 is increased, and, as the battery is charged and the specific gravity of its electrolyte increases, the hydrometer 40 rises and cuts resistance out of the circuit of the coil 24. Because of the increased resistance in circuit with the coil 24, when the charge of the battery is low, an increased amount of current must traverse the resistance 26 in order to cause a sufficient amount of current to traverse the coil 24 to effect disengagement of the contact terminal 19 from the terminal 18, or to move the terminal 19 downwardly. Since the current which traverses the resistance 26 is that which is supplied to the circuit by the generator 4, it will be seen that the variations of the resistance 37, in accordance with the specific gravity of the electrolyte of the battery, automatically effects adjustment of the load carried by the generator 4. This will now be more fully explained in connection with a detailed description of the operation of the regulator.

When the battery is supplying current to the circuit to supplement that supplied by the generator, and its voltage equals that of the circuit, the booster is not required to either supplement or oppose the battery voltage, and, consequently, its voltage should be zero. That is, the resultant field excitation of the booster, and also that of the exciter, should be nil. In order to obtain zero resultant field excitation in the exciter, the auxiliary field magnet windings thereof should afford equal magnetizing effects, which results from causing such a vibratory movement of the arm 30 that the contact terminals 31 alternately engage the terminals 32 and 33 for equal periods of time. The manner in which this is effected in the present instance will be understood by supposing that, for a moment, the terminals 18 and 19 are in very close proximity but out of engagement. Then, since the circuit of the magnet winding 29 is open the magnet winding 35 causes the right hand end of the arm 30 to be attracted and drawn upwardly, and contact terminal 31 is caused to engage the terminal 33 and to thereby shunt the resistance 13. Auxiliary field magnet winding 11 of the exciter will, therefore, be more strongly excited than the winding 12, and the exciter 9 will generate a voltage in such direction that the booster voltage will supplement that of the battery, and the battery will supply a slightly increased amount of current to the circuit 1—2. The direction of current flow in the coil 21 will then be such that the coil will be moved upwardly against the action of the spring 20 and the contact terminal 18 will approach the terminal 19. The current supplied by the generator then decreases slightly, because of the increased amount of current supplied by the battery, and the current traversing the coil 24 also decreases, with the result that the terminal 19 approaches the terminal 18. As both of the terminals 18 and 19 are so moved as to approach each other, they will ultimately engage and establish the circuit of the winding 29, thus permitting the spring 34 to effect engagement of the terminals 31 and 32. The resistance 14 is thus shunted, and the winding 12 then predominates in its magnetizing effect and causes a reversal of the polarity of the exciter field, as well as a reversal of the polarity of the booster field, the voltage of which is caused to oppose that of the battery. Reversal of the current in the booster field circuit also reverses the current in the coil 21 and causes downward movement of the coil, with the result that the terminal 18 recedes from the terminal 19. Since the booster voltage then opposes that of the battery, the current supplied to the circuit by the battery will decrease slightly in amount, while that supplied by the generator will increase correspondingly. The current traversing the coil 24 also increases, and the terminal 19 recedes from the terminal 18. In this manner, the terminals 18 and 19 are caused to engage and disengage in quick succession, and the contact terminals 31 are caused to engage alternately in quick succession with the stationary terminals 32 and 33. The regulator continues to operate thus so long as the voltage of the battery remains approximately equal to that of the circuit to which it is connected and the load upon the circuit remains substantially constant. The fluctuations of the current that traverses the circuit 1—2, and of the exciter voltage, will ordinarily occur between very narrow limits, and the fluctuations in the voltage of the booster will be scarcely noticeable under the conditions set forth, because the voltage is affected only indirectly or remotely by the operation of the regulator.

If the current required by the translating devices 3 increases in amount, which has a tendency to reduce the voltage of the circuit, the current traversing the coil 24 will increase proportionately and the terminal 19 will be caused to recede from the terminal 18, so that, as the latter is vibrated, by reason of the reversals of the current in the booster field circuit, it will be required to move a greater distance in order to engage the terminal 19 and will accordingly engage therewith later and for shorter periods of time than under the conditions previously described. The periods of energization of the coil 29 will, therefore, be diminished and one of the terminals 31 will be caused to engage the stationary terminal 33 for longer periods of time than it engages the stationary terminal 32, with the result that the auxiliary field magnet winding 11 of the exciter will have such a predominating effect upon the polarity and strength of the field of the exciter, and in turn upon the field of the booster, that the booster will supply just sufficient voltage supplementary to that of the battery to cause the battery to discharge an increased amount of current and to maintain the voltage of the circuit 1—2 substantially constant.

If the increased load afforded by the devices 3 continues for a sufficient period of time to materially diminish the charge of the battery 5, and to thereby decrease the specific gravity of its electrolyte, an increased amount of the resistance 37 will be automatically inserted in the circuit of the coil 24, and the terminal 19 will be raised a slight amount so that the terminal 18 will be required to move a shorter distance than previously in order to engage therewith. The periods of energization of the coil 29 therefore increase somewhat and the periods of engagement of the movable terminals 31 with the stationary terminals 32 and 33 become nearly equal, with the result that the auxiliary field magnet winding 11 has a diminished effect upon the field of the exciter. The field of the booster is accordingly somewhat weakened and its voltage is correspondingly diminished. The battery then discharges at a slower rate, and the generator 4 is caused to carry a larger proportion of the total load. Thus it is seen that, as the battery becomes discharged, and the specific gravity of its electrolyte decreases, it is required to discharge current at a slower rate, and, accordingly, there is less liability of discharging the same, or of reducing the specific gravity of its electrolyte to an injurious degree.

Since the battery is employed for the purpose of assisting the generator in carrying the load, it is not desirable that, when the specific gravity of its electrolyte is sufficiently reduced, it should begin to charge and serve as an additional load upon the generator, and to avoid this, the limiting values of the resistance inserted in series with the winding 26 under the different conditions of operation must be properly adjusted, or stops 41 may be provided for limiting the movements of the rheostat arm 39.

If the load afforded by the device 3 diminishes, the current traversing the resistance 26 will decrease, and also that traversing the coil 24, with the result that the contact terminal 19 will be raised. The terminal 18 is then required to move a shorter distance in order to engage the terminal 19, and the periods of energization of the winding 29 accordingly increase in length, as well as the periods of engagement of one of the terminals 31 with the terminal 32. The influence of the winding 11 upon the exciter field is, therefore, diminished, while that of the winding 12 is increased, with the result that the booster voltage is diminished, and the battery supplies a smaller amount of current to the circuit 1—2.

If the load upon the circuit becomes less than a predetermined amount, the current which traverses the coil 24 will be so reduced that the periods of engagement of the terminals 18 and 19 and of energization of the winding 29 will be shortened to such a degree that the winding 12 of the exciter will predominate in its effect upon the field over the winding 11, and the exciter and booster voltages will be reversed, thereby causing charging of the battery with current received from the generator.

If the battery has been so discharged, before a diminution of load upon the circuit 1—2, that the specific gravity of the electrolyte of the battery is materially reduced, the battery will begin to charge sooner, or with a greater load upon the circuit, than when the specific gravity is greater. As before explained, when the charge and specific gravity of the electrolyte of the battery are low, an increased amount of the resistance 37 will be included in circuit with the coil 24, and the amount of current traversing the said coil, with a given load upon the circuit 1—2, will be correspondingly lessened. Because of the diminished current that traverses the coil 24, by reason of the low specific gravity of the electrolyte of the battery, the contact terminal 19 will be somewhat raised and the periods of engagement thereof with the terminal 18 will be of longer duration and, accordingly, also the periods of energization of the winding 29 of the auxiliary relay. One of the terminals 31 is accordingly caused to engage the terminal 32 for increased periods of time, with the result that the auxiliary field magnet winding 12 has less influence upon the field of the exciter than when the specific gravity of the electrolyte of the battery is greater, and the winding 11 has a correspondingly greater influence upon the field of the exciter. The fields of the exciter and booster will, therefore, become reversed sooner, and charging of the battery will begin sooner than when the electrolyte of the battery is of high specific gravity. Thus it is seen that the generator is caused to carry an increased amount of current, or an increased proportion of the total load upon the circuit, as the charge of the battery decreases, and until it is again charged to a predetermined degree.

If the voltage of the battery exceeds that of the circuit when it supplies current thereto, the battery, because of its higher voltage, tends to supply more than its proportionate amount of current, and the amount supplied by the generator is correspondingly reduced. Contact terminal 19 is consequently raised and the periods of engagement of one of the contact terminals 31 with the stationary terminal 32 are of increased duration, with the result that the winding 12 has a greater effect upon the exciter field than the winding 11, and the booster voltage opposes that of the battery by an amount approximately equal to the difference between the voltage of the circuit and that of the battery. It will be understood, on the other hand, that if the combined battery and booster voltage is less than that of the circuit, contact terminal 19 will be slightly lowered, because of the tendency of the generator to supply more than its proportion of the current to the circuit and the correspondingly increased amount of current traversing the coil 24. The periods of energization of the winding 29 are accordingly of less duration, and the periods of engagement of one of the terminals 31 with the stationary terminal 33 are of correspondingly greater duration. The result is, that the average excitation of the booster field will then be of such strength and polarity that the booster will generate an increased voltage of such value that the combined battery and booster voltage will equal that of the circuit.

In Fig. 1, the hydrometer is employed to directly actuate the arm of the rheostat that is included in circuit with the coil 24, but, in Fig. 2, the hydrometer is merely provided with a contact member 43 that is adapted to be moved vertically, as the hydrometer rises and sinks, between two contact terminals 44 and 45 that are carried at one end of a pivotally mounted rheostat arm 46, at the other end of which is a member 47 which is adapted to engage a series of stationary contact terminals 48. The contact terminals 48 are connected to suitable points of subdivision of a resistance device 49 that is in series with the coil 24 of the main relay device, only a portion of which it has been deemed necessary to illustrate in this figure. The rheostat arm 46 is adapted to be operated in opposite directions, respectively, by solenoids 50 and 51, terminals of which are connected, respectively, to contact terminals 45 and 44, and the remaining terminals of which are connected to any suitable constant potential source, such as the circuit 1—2. Current is conducted to the contact member 43, that is carried by the hydrometer, through the electrolyte of the battery, to a conductor 53 that projects through the hydrometer at its lower end and extends vertically to the contact member 43.

As the battery becomes discharged and the specific gravity of its electrolyte decreases, the hydrometer sinks and the contact member 43 is brought into engagement with contact terminal 45, thus establishing the circuit of the solenoid winding 50. Upon the energization of the said winding, the rheostat arm 46 is given such rotative movement as to raise the contact member 47 and thereby introduce an increased amount of the resistance 49 into circuit with the coil 24 and to lower the contact terminal 45 until it becomes disengaged from the contact member 43, whereupon, the circuit of the winding 50 is interrupted and the movement of the rheostat arm 46 is stopped. If the specific gravity of the electrolyte of the battery increases by reason of the charging of the battery, the contact member 43 will be raised into engagement with the terminal 44, and the circuit of the solenoid winding 51 will be established, with the result that the contact member 47 will be moved downwardly to remove some of the resistance 49 from the circuit of the coil 24 and to cause disengagement of the terminal 44 with the contact member 43. The effects of increasing and decreasing the resistance in the circuit of the coil 24 are the same as have been described in connection with the system of Fig. 1.

Under some conditions, in practice, it may be desirable to have the regulating apparatus located remotely from the battery, and in Fig. 3, I have shown a system adapted to this purpose. As in Fig. 2, the hydrometer carries a contact member 55 that is brought into engagement with a stationary contact terminal 56, as the battery is charged, and the specific gravity of its electrolyte is increased and with a stationary contact terminal 57, as the battery is discharged and the specific gravity of its electrolyte is reduced. The contact terminals 56 and 57 are connected, respectively, to terminals of magnet windings 58 and 59, the remaining terminals of which are connected to a suitable source of constant potential, such as the circuit 1—2, the circuit being completed through the electrolyte of the battery and a conductor 60 that extends vertically within the hydrometer and projects at its lower end into the electrolyte. The magnet windings 58 and 59 are, when energized, adapted to actuate armatures 61 and 62 in opposition to springs 63 and thereby establish circuits containing an auxiliary battery 64, or a portion of the main battery, or any other suitable source, and magnet windings 65 and 66 of two polarized relays. It will be understood, from the arrangement of the connections shown, that current will traverse the circuit including the magnet windings 65 and 66 in one direction when the magnet winding 58 is energized and in the opposite direction when the magnet winding 59 is energized. The polarized relays, of which the magnet windings 65 and 66 constitute parts, also comprise magnets 67 and 68 that are arranged with poles of opposite sign uppermost, and pivotally mounted armatures 69 and 70 that may be moved into and out of engagement with stationary contact terminals 71 and 72. The arrangement of the circuits is such that when the magnet winding 58 is energized the armature 69 will be caused to engage the terminal 71, and, when the magnet winding 59 is energized, the armature 70 will be moved into engagement with the terminal 72. When the armature 69 engages the contact terminal 71, a circuit is established including a solenoid 73, and when the armature 70 engages the terminal 72 the circuit of the solenoid 74 is established, the said circuit being derived from any suitable source of constant potential, such as the circuit 1—2. The solenoids 73 and 74 constitute the actuating means for a rheostat arm 75 that governs the amount of resistance in circuit with the coil 24 of the main relay device, such as that shown in Fig. 1, which it has not been deemed necessary to again illustrate. The movements of the rheostat arm 75 are retarded to a very considerable degree by means of a dash-pot 76 or any other suitable device.

As the battery becomes discharged and the specific gravity of its electrolyte is reduced, the contact member 55 is lowered into engagement with the terminal 57 and the circuit of magnet winding 59 is established, thus causing the armature 70 to engage the terminal 71, which, in turn, establishes the circuit of the magnet winding 73. The rheostat arm is then moved slowly against the action of the dash-pot 76 to increase the resistance in circuit with the coil 24, the effect of which is the same as that described in connection with the system of Fig. 1. As the battery becomes charged and the specific gravity of its electrolyte increases, the member 55 is raised into engagement with the terminal 56 and the circuit of the magnet winding 58 is established, with the result that the armature 69 is caused to engage terminal 71, and the circuit of the magnet winding 74 is established. The rheostat arm 75 is then moved very slowly to remove resistance from the circuit of the coil 24, the effect of which is also the same as that described in connection with the system of Fig. 1.

I claim as my invention:

1. The combination with a secondary battery, of a dynamo-electric machine having its armature in series therewith, and means for automatically regulating the said machine in accordance with the specific gravity of the electrolyte of the battery.

2. The combination with a secondary battery, of a dynamo-electric machine having its armature in series therewith, and means for automatically regulating the field strength and polarity of the said machine in accordance with the specific gravity of the electrolyte of the battery.

3. The combination with a secondary battery, of a dynamo-electric machine having its armature in series therewith, and hydrometric means directly associated with said battery for regulating the said machine.

4. A system of distribution comprising an electrical circuit, a storage battery, a dynamo-electric machine associated therewith, and means for automatically regulating the dynamo-electric machine in accordance with the amount of current traversing the circuit and in accordance with the specific gravity of the electrolyte of the battery.

5. A system of distribution comprising an electrical circuit, a storage battery, a generator associated therewith, an exciter for the generator, and means for governing the direction and value of the generator electromotive force in accordance with the variations in the amount of current traversing the circuit, in the voltage of the exciter, and in the specific gravity of the electrolyte of the battery.

6. A system of distribution comprising an electrical circuit, a storage battery, a generator having a main field magnet winding and two auxiliary field magnet windings, and means for adjusting the relative magnetizing effects of the auxiliary field magnet windings in accordance with the electrical variations in the said circuit and in accordance with the specific gravity of the electrolyte of the battery.

7. A system of distribution comprising an electrical circuit, a storage battery, a generator associated therewith, an exciter for the generator having a main field magnet winding and two auxiliary field magnet windings, and means for adjusting the relative magnetizing effects of the auxiliary field magnet windings of the exciter in accordance with variations in the electrical conditions of the said circuit and in accordance with the specific gravity of the electrolyte of the battery.

8. A system of distribution comprising an electrical circuit, a storage battery, a generator associated therewith, an exciter for the generator having a main field magnet winding and two auxiliary field magnet windings, and means for adjusting the relative magnetizing effects of the auxiliary field magnet windings of the exciter in accordance with the amount of current traversing the circuit, the voltage of the exciter and the specific gravity of the electrolyte of the battery.

9. A system of distribution comprising an electrical circuit, a storage battery, a generator associated therewith, an exciter for the generator having a main field magnet winding and two auxiliary field magnet windings, resistances respectively in circuit with the auxiliary field magnet windings, and means for adjusting the effective values of the said resistances in accordance with variations in the electrical conditions of the said circuit and in the specific gravity of the electrolyte of the battery.

10. A system of distribution comprising an electrical circuit, a storage battery, a generator associated therewith, an exciter for the generator having a main field magnet winding and two auxiliary field magnet windings, resistances respectively in circuit with the auxiliary field magnet windings, and means for adjusting the effective values of the said resistances in accordance with the amount of current traversing the said circuit, the voltage of the exciter and the specific gravity of the electrolyte of the battery.

11. The combination with an electrical circuit, a storage battery, and a generator associated therewith, of means for governing the direction and value of the electromotive force of the generator comprising two coöperating contact-carrying members one of which is actuated in response to variations in the direction and value of the voltage applied to the field magnet winding of the generator and the other of which is actuated in response to variations in the amount of current traversing the electrical circuit, and means for adjusting the value of the actuating force for the latter member in accordance with the specific gravity of the electrolyte of the battery.

12. The combination with an electrical circuit, a storage battery, a generator associated therewith, and an exciter for the generator, of means for governing the direction and value of the electromotive force of the generator comprising two coöperating contact members one of which is actuated in response to variations in the voltage of the exciter and the other of which is actuated in response to variations in the amount of current traversing the electrical circuit, and means for adjusting the value of the actuating force for the latter member in accordance with the specific gravity of the electrolyte of the battery.

13. The combination with an electrical circuit, a storage battery, a generator associated therewith and an exciter for the generator, of means for governing the direction and value of the electromotive force of the generator comprising two coöperating contact-carrying members one of which is provided with an actuating coil that is connected across the exciter terminals and the other of which is provided with an actuating coil supplied with current which is proportional in amount to that which traverses the electrical circuit, and means for regulating the amount of resistance in circuit with the latter coil in accordance with the specific gravity of the electrolyte of the battery.

14. The combination with a secondary battery, and hydrometric means directly associated therewith for regulating the rate of charging and discharging thereof.

15. The combination with a storage battery, and means for causing the same to charge and discharge, of means for regulating the rate of charge and discharge of the battery in accordance with the specific gravity of its electrolyte.

16. In combination, a storage battery, a booster associated therewith, and means causing the booster to regulate the charging and discharging of the battery in accordance with the specific gravity of its electrolyte.

17. In combination, a storage battery, a booster associated therewith, and means for alternately applying to the field winding of the booster a maximum and a minimum excitation and for varying the polarity and relative duration of maximum and minimum excitation in accordance with the specific gravity of the electrolyte of the battery.

18. In combination, a storage battery, a booster associated therewith, means for alternately applying to the field winding of the booster a maximum and a minimum excitation, and means for causing the polarity and relative duration of maximum and minimum excitation to vary in accordance with the specific gravity of the electrolyte of the battery.

19. The combination with an electric circuit, a generator supplying the same, and a battery associated with the circuit, of means for regulating the battery to cause the amount of load upon the generator to vary according to the specific gravity of the electrolyte of the battery.

20. The combination with a secondary battery, of means associated with said battery for automatically regulating its rate of charge and discharge in accordance with its condition of charge.

21. In a system of electrical distribution, an electric circuit and its source, a storage battery permanently connected to said circuit and operatively arranged to deliver energy to and receive it from the circuit, means for controlling the charge and discharge of the battery, and means controlled by the specific gravity of the solution in the battery for varying the average load upon said source.

22. In a system of electrical distribution, an electric circuit and its source, a storage battery permanently connected to said circuit and operatively arranged to deliver and receive energy to and from said circuit, means for varying the average load upon said source, and a controller for said means comprising an element sensitive to changes in specific gravity of the solution in said battery.

23. In a system of electrical distribution, an electric circuit and its source, a storage battery operatively arranged to deliver energy to and receive it from the circuit and means for controlling the battery charge or discharge, comprising a regulator, a rheostat, an actuator for the rheostat, and means dependent upon the specific gravity of the solution in a battery cell due to the state of the battery charge or discharge for governing the duration of movement of the rheostat actuator.

24. In an electrical system of distribution, a source of electrical energy, a distribution circuit and its load fed thereby, a compensatory storage battery operatively related thereto, means for controlling the division of load between the source and the battery responsive to certain variations in the electrical condition of the system, and means responsive to variations from a predetermined condition of the battery state of charge for opposing or cutting down the action of said controlling means and returning the battery to that state of charge.

25. In an electrical system of distribution, a distribution circuit, a compensatory storage battery in operative relation thereto, means for regulating the charge and discharge of the battery responsive to variations in the electrical condition of the system, and means responsive to variations from a predetermined condition of the battery state of charge, acting to restore the battery to that condition of charge.

26. In an electrical system of distribution, a distribution circuit, a compensatory storage battery in operative relation thereto, means for regulating the charge and discharge of the battery responsive to variations in the electrical condition of the system, and slower acting means responsive to variations from a predetermined condition of the battery state of charge, acting to restore the battery to that condition of charge.

27. In an electrical system of distribution, a source of electrical energy, a distribution circuit and its load fed thereby, a compensatory storage battery operatively related thereto, means for controlling the division of load between the source and the battery responsive to certain variations in the electrical condition of the system, and slower acting means responsive to variations from a predetermined condition of the battery state of charge for regulating the action of said controlling means and restoring the battery to that state of charge.

28. In an electrical system of distribution, a main generator, a circuit and its load supplied thereby, a compensatory storage battery connected thereto, a booster and regulating apparatus for controlling the charge and discharge of the battery responsive to variations in the load on said circuit, and means acting to cause the battery to return substantially to a predetermined condition of state of charge as the specific gravity of the liquid in one of the cells of the storage battery varies.

29. In an electrical system of distribution, a distribution circuit, a compensatory storage battery in operative relation thereto, means responsive to variations in the electrical condition of the system for causing the battery to charge or discharge to compensate for variations in load on the circuit and means for causing the battery to return to a predetermined condition of charge after the battery stops charging or discharging when compensating for said variations in load.

30. The combination of a storage battery, means for controlling the charge and discharge of said battery, and means for regulating the action of said controlling means responsive to variations in the condition of the battery state of charge.

31. The combination of a storage battery, means for controlling the charge and discharge of said battery and means for regulating the action of said controlling means to cause the battery to assume a predetermined condition of state of charge responsive to variations in the condition of the battery state of charge.

32. The combination of a storage apparatus, means for controlling the charge or discharge of said apparatus and means for regulating the action of said controlling means responsive to variations in the condition of the state of charge of said apparatus.

33. In an electrical system of distribution, a source of electrical energy, a main circuit and its load fed thereby, a compensatory storage apparatus in operative relation therewith, means for controlling the division of load between the source and the battery responsive to variations in the electrical condition of the system, and means responsive to variations from a predetermined condition of charge of the apparatus, acting to cause the storage apparatus to tend to return to that condition of charge.

In testimony whereof, I have hereunto subscribed my name this 10th day of March, 1909.

FRANK CONRAD.

Witnesses:
WM. BRADSHAW,
B. B. HINES.